S. J. TODD & A. M. HUMBER.
MILLING MACHINE.
APPLICATION FILED JUNE 20, 1914.

1,138,515.

Patented May 4, 1915.
7 SHEETS—SHEET 1.

Witnesses
E. R. Barrett
Karl H. Butler

Inventors
Samuel Joseph Todd
Albert Milton Humber
By
Attorneys

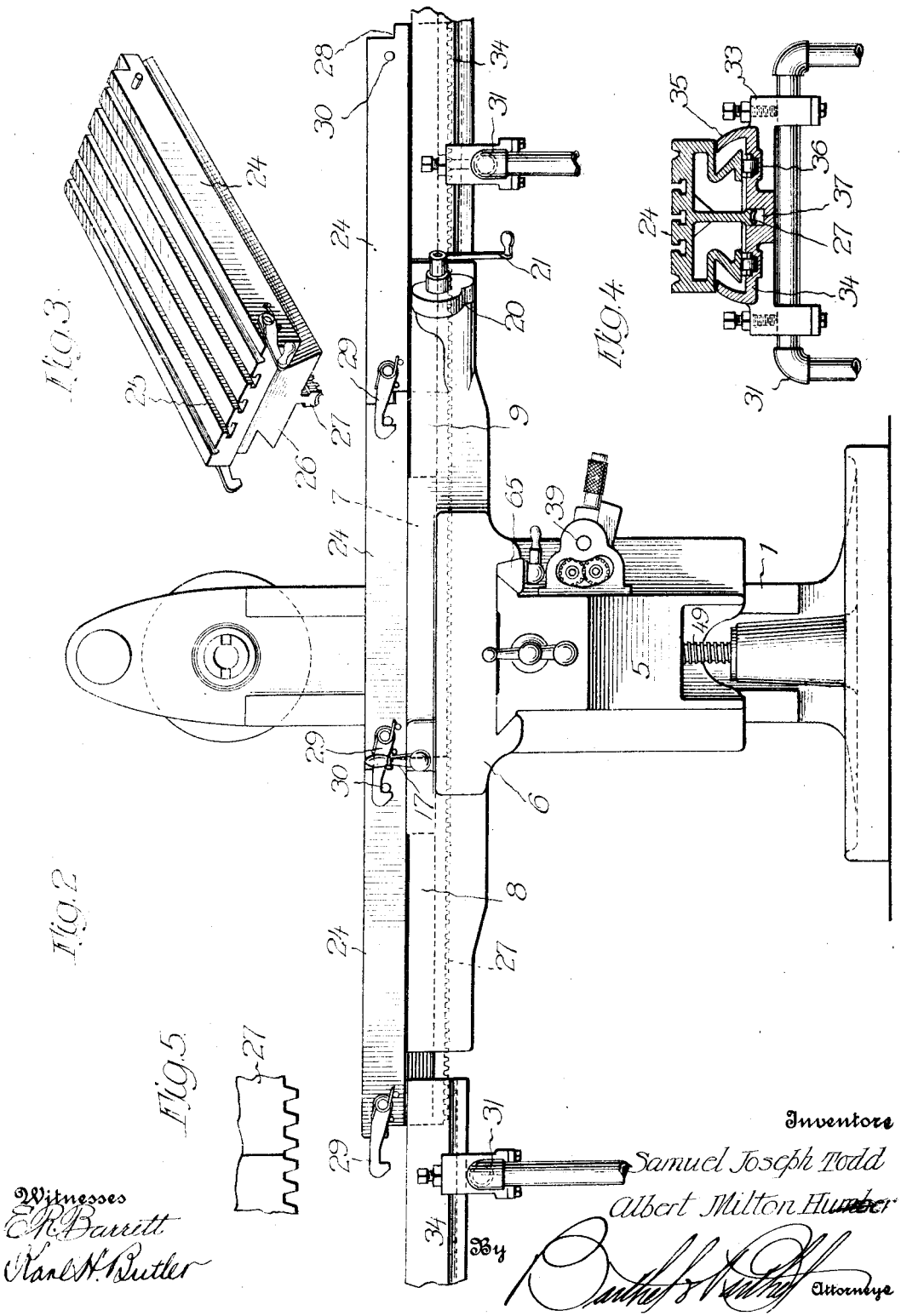

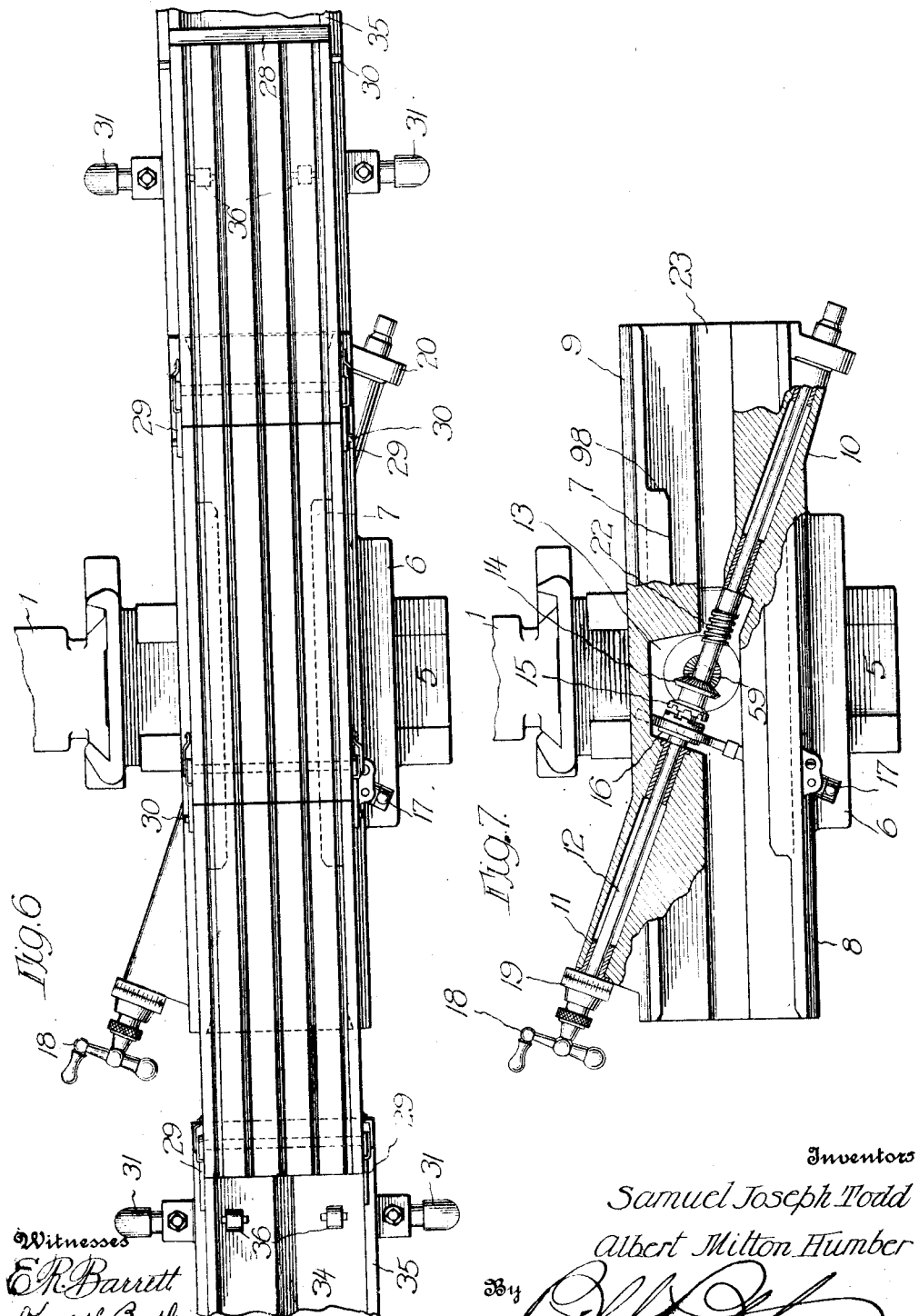

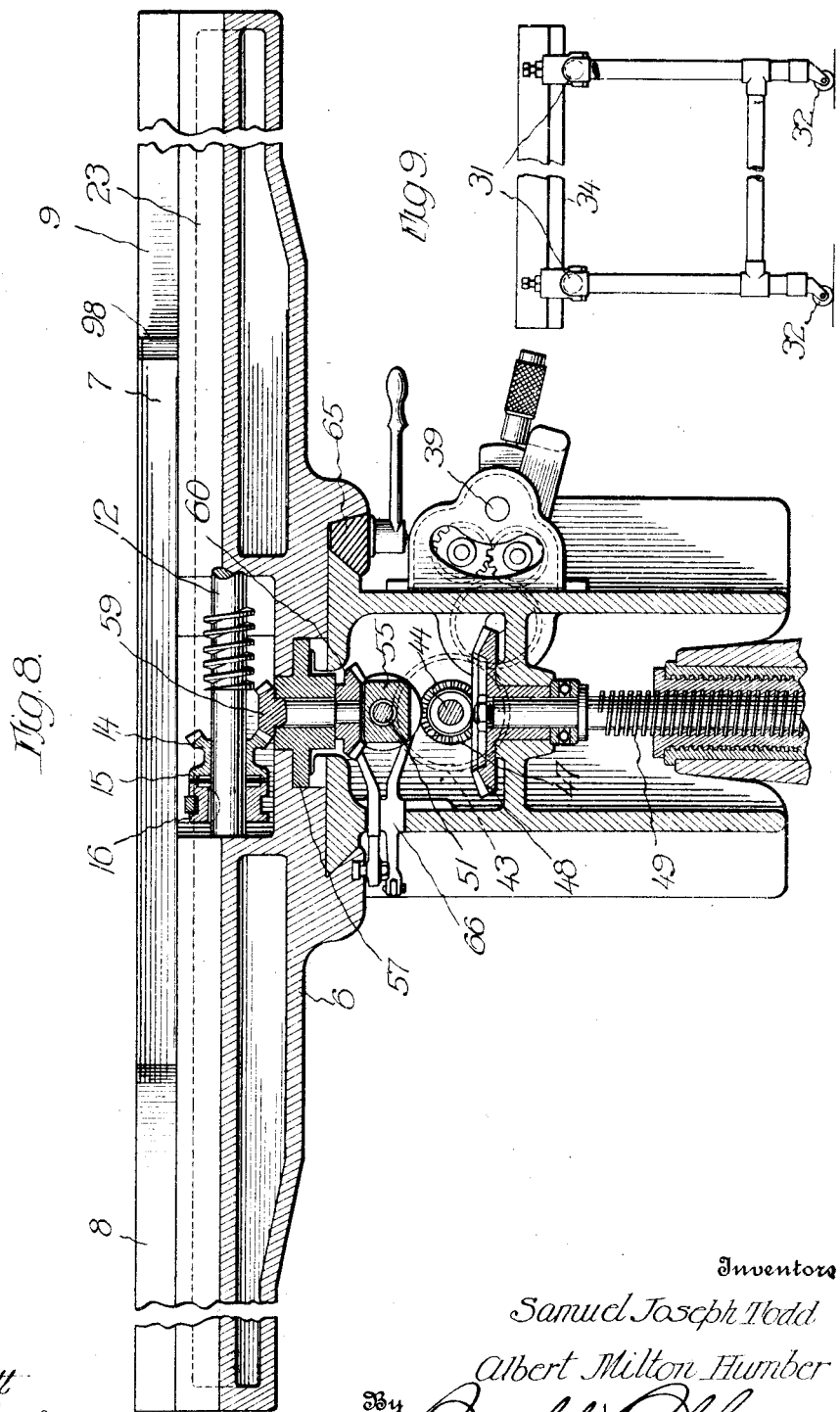

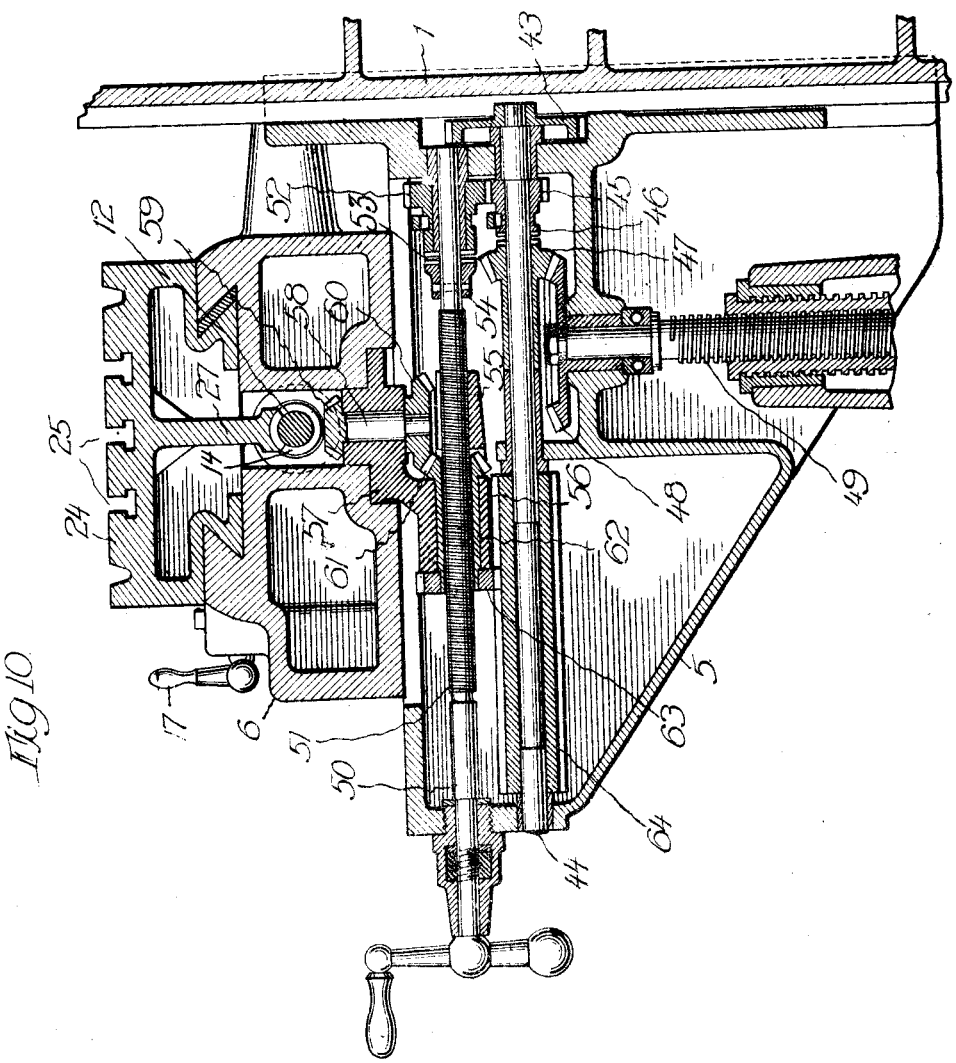

S. J. TODD & A. M. HUMBER
MILLING MACHINE.
APPLICATION FILED JUNE 20, 1914.

1,138,515.

Patented May 4, 1915.
7 SHEETS—SHEET 6.

Witnesses
E. R. Barrett
Karl H. Butler

Inventors
Samuel Joseph Todd
Albert Milton Humber

By
Attorneys

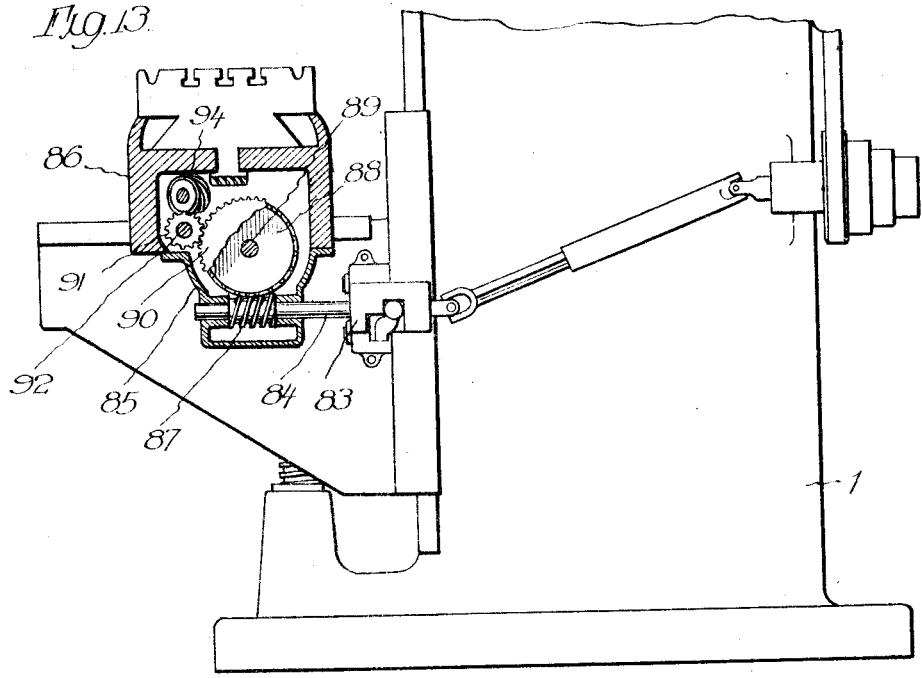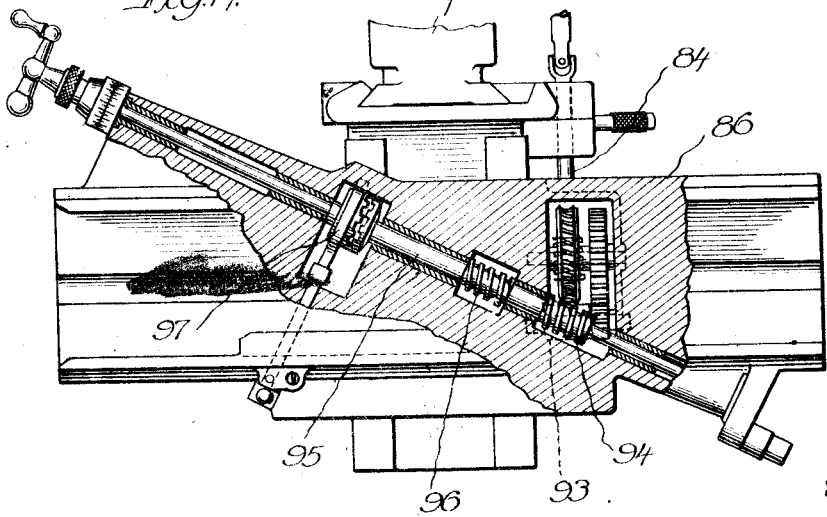

UNITED STATES PATENT OFFICE.

SAMUEL JOSEPH TODD AND ALBERT MILTON HUMBER, OF HIGHLAND PARK, MICHIGAN.

MILLING-MACHINE.

1,138,515.  Specification of Letters Patent.  Patented May 4, 1915.

Application filed June 20, 1914. Serial No. 846,229.

*To all whom it may concern:*

Be it known that we, SAMUEL JOSEPH TODD and ALBERT MILTON HUMBER, citizens of the United States of America, residing at Highland Park, in the county of Wayne and State of Michigan, have invented certain new and useful Improvements in Milling-Machines, of which the following is a specification, reference being had therein to the accompanying drawings.

This invention relates to milling machines and attachments, and the primary object of our invention is to provide a milling machine having a plurality of inter-exchangeable tables that can be easily and quickly placed in position to be successively moved in the milling machine, and thereby increase the production of the machine.

A further object of this invention is to provide a milling machine attachment that permits of one or more tables being used in connection with the same, one table permitting of a piece of work being repeatedly operated upon without removing the piece of work from the table, and a plurality of tables permitting of a large number of pieces of work being successively operated upon without the usual delay caused by making adjustments.

With the above and other objects in view, the invention resides in the novel construction, combination and arrangement of parts to be hereinafter specifically described and then claimed.

Reference will now be had to the drawings, wherein—

Figure 1:
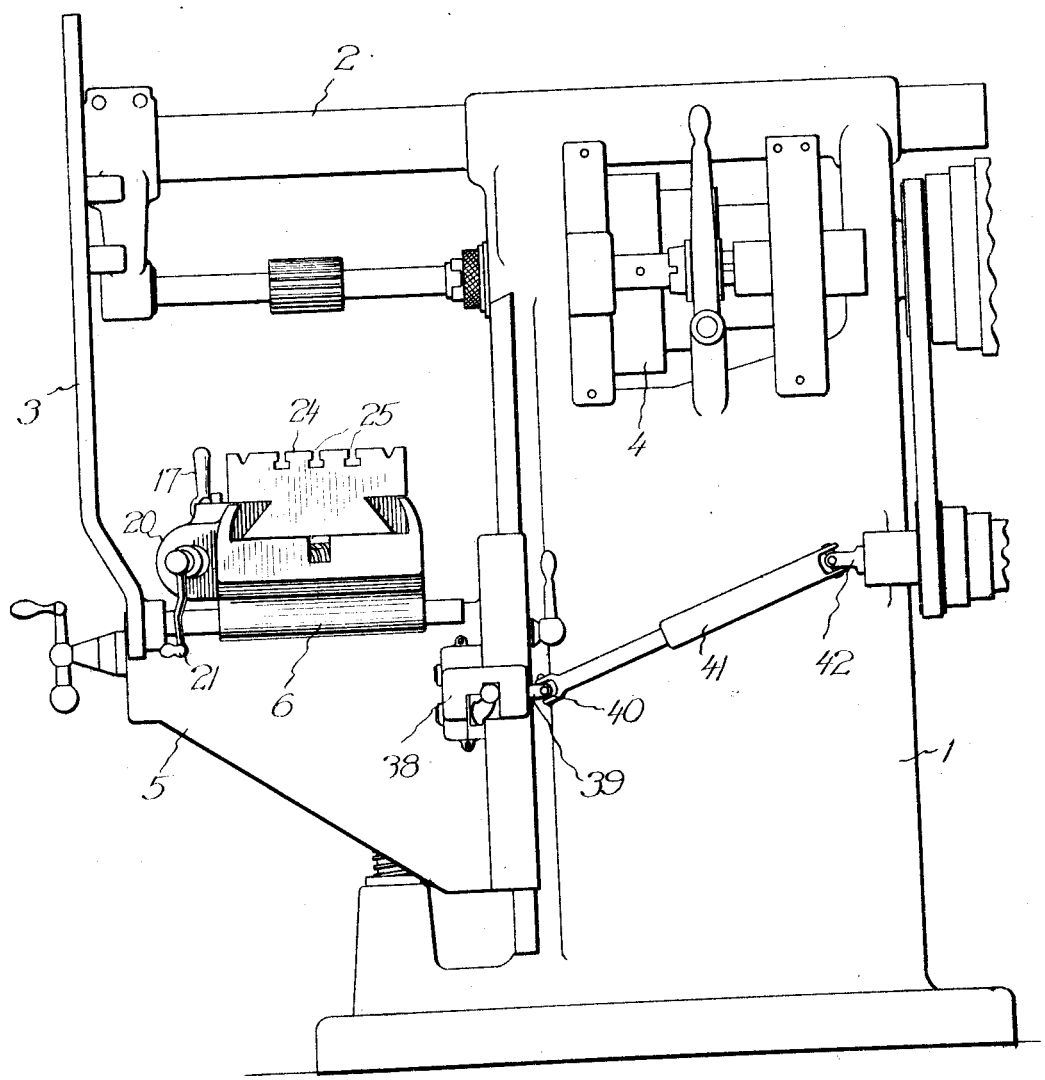
Figure 11:
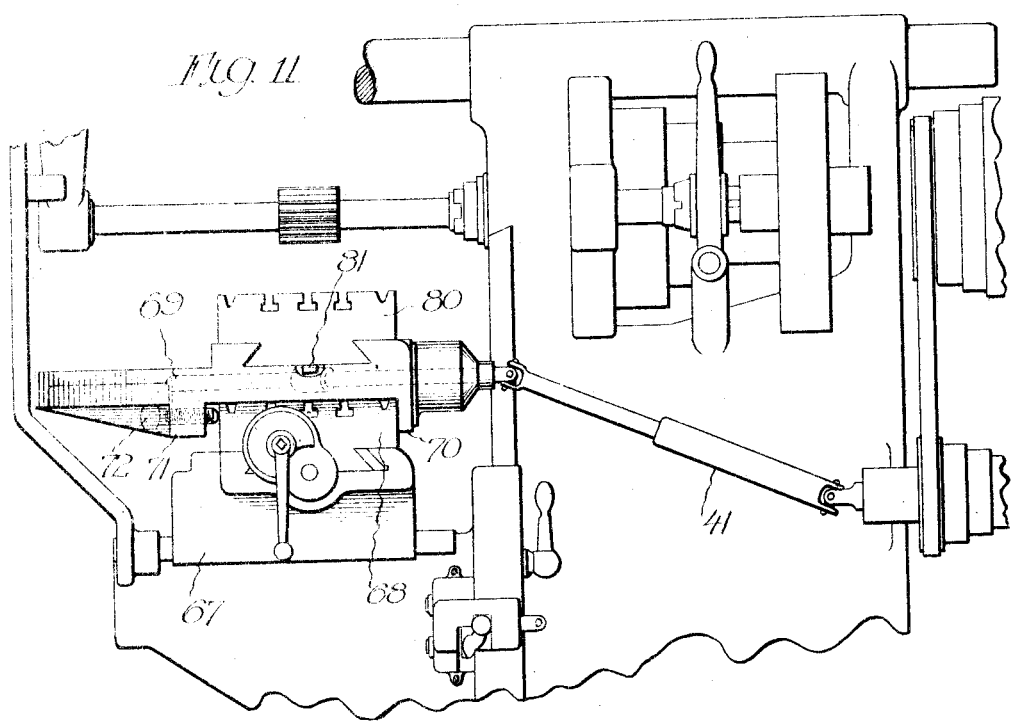
Figure 12:
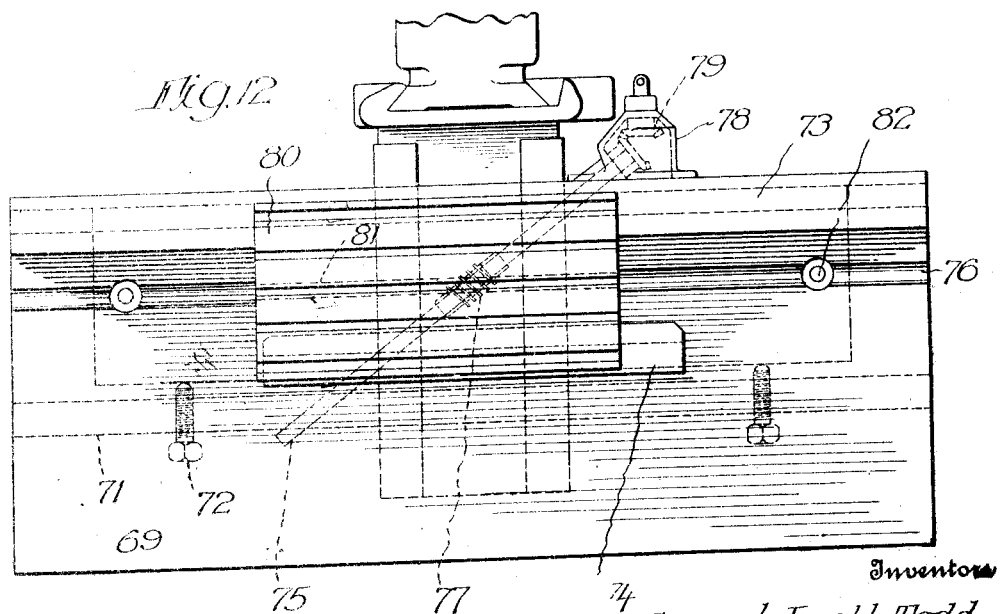

Figure 1 is a side elevation of a milling machine in accordance with this invention; Fig. 2 is a front elevation of the machine with the arbor removed; Fig. 3 is a perspective view of a detached table; Fig. 4 is a cross sectional view of a table and a carriage, the latter being partly broken away; Fig. 5 is a side elevation of portions of racks illustrating the manner in which the racks abut when tables are coupled together; Fig. 6 is a plan of a portion of the milling machine illustrating inter-locked tables; Fig. 7 is a plan of the saddle of the milling machine partly broken away and partly in section, illustrating a portion of the manually operated and automatic table feeding mechanism; Fig. 8 is an enlarged longitudinal sectional view of the saddle of the milling machine, illustrating the feed trip and reverse in connection with the table feeding mechanism; Fig. 9 is a side elevation of a carriage; Fig. 10 is an enlarged cross sectional view of a portion of the milling machine; Fig. 11 is a side elevation of the milling machine provided with an attachment; Fig. 12 is a plan of the same; Fig. 13 is a cross sectional view of a portion of a milling machine illustrating a rapid transmission mechanism, and Fig. 14 is a plan of the same partly broken away and partly in section.

In describing our invention by aid of the views above referred to, we desire to point out that we intend said views as merely illustrative of an example whereby our invention may be applied in practice, and we do not limit the invention to the exact construction and arrangement of parts shown. The following description is therefore to be broadly construed as including substitute constructions and arrangements which are the obvious equivalent of those shown.

In the drawings, there is illustrated a milling machine embodying, among other things, a column 1, an over-arm 2, an arbor support 3, a cone spindle 4, a knee 5, and a saddle 6.

The saddle 6 is best shown in Figs. 2, 6 and 7, wherein it will be observed that said saddle has the ordinary guide way 7 and is provided with side extensions 8 and 9, thereby increasing the length of the saddle over that ordinarily used in connection with milling machines. The extensions 8 and 9 are provided with angularly disposed enlargements 10 and mounted in said enlargements are bushings 11 supporting a revoluble shaft 12. The shaft 12 is diagonally disposed relatively to the saddle 6, said shaft extending through a recess 13 in the bottom of said saddle. Loosely mounted upon the shaft 12, within the recess 13, is a beveled gear wheel 14 having a clutch member 15 adapted to be engaged by a clutch member 16 slidably keyed upon the shaft 12, and adapted to rotate therewith. The clutch member 16 is moved into and out of engagement with the clutch member 15 of the beveled gear wheel 14 by a shifting device 17 operatable at the front side of the saddle 6. It is through the medium of the shifting device 17 that the operation of the shaft 12 is controlled. At one end of the shaft 12 there is a hand crank 18 and a micrometer scale 19, and at the opposite end of the shaft 12 there is a gear case 20 and a crank 21 which permit of the shaft 12 being rapidly revolved for a quick adjustment. The shaft 12, adjacent to the beveled gear wheel 14, is provided with a worm 22, and said worm is within a longitudinal rack way 23 that extends longitudinally of the saddle from one extension to the other.

Especially designed to move longitudinally of the saddle 6 are hollow oblong tables 24 which are identical in construction, one of the tables being clearly shown in Figs. 3 and 4. Each table has the top thereof provided with the ordinary grooves 25 that permit of a piece of work being clamped to the table by suitable fastening means engaging in the grooves 25, and each table has a depending hollow longitudinal dove-tailed tongue 26. Each table is of less length than the saddle 6 and the extensions thereof, and the ends of the guide way 7 of the saddle 6 are beveled or cut away, as at 98, whereby the tongues 26 can readily enter the guide way 7, this being essential when a plurality of tables are coupled together, as will hereinafter appear. The tables 24 are provided with longitudinal depending racks 27 that extend below the tongues 26, and when a plurality of the tables are coupled together, the racks 27 abut, as shown in Fig. 5, thus forming one continuous rack which engages the worm 22 of the shaft 12. The ends of the tables 24 are cut away, as at 28, whereby one table will over-lap the other and to retain the tables 24 in longitudinal alinement and inter-locked to move in unison, the sides of the tables, at the ends thereof, are provided with spring pressed pivoted latches or hooks 29 and outwardly extending pins 30. The latches or hooks 29 are adapted to engage the pins 30 of an adjoining table, as best shown in Fig. 2 and in this manner the tables are detachably connected whereby a table can be removed from either end of the saddle 6.

In order that one of the tables 24 and a piece of work attached thereto can be conveniently moved, two or more carriages 31 are employed. These carriages are preferably made of tubing or structural steel and are provided with casters 32 whereby they can be easily moved about the milling machine. Adjustably mounted upon each carriage are the bearings 33 of longitudinal channel-shaped holders 34. The holders 34 have side flanges 35, anti-frictional spaced rollers 36, and longitudinal grooves 37, said grooves providing clearance for the racks 27 of the tables 24. The tongues 26 of the tables 24 are adapted to ride upon the rollers 36 and with the flanges 35 of the holders extending under the tables, said flanges serve as guards and deflectors for shavings and other matter that might interfere with the movement of a table longitudinally of the holder of a carriage. It is through the medium of the adjustable bearings 33 that the holder of a carriage can be properly positioned to longitudinally aline with one of the extensions 8 or 9 of the saddle, whereby a table can readily move off of a carriage onto an extension and through the guide way 7 of the saddle. It is in this connection, that the saddle and guide way thereof are not subjected to stresses and strains by reason of the guide way extending from the outer end of one extension to the outer end of the other extension, and a carriage actually supports the greater part of a table until it enters the guide way 7 of the saddle. As illustrated in Fig. 2, a carriage is located at each end of the milling machine and after a piece of work has been operated upon the table thereof can be uncoupled from the train of tables, and then the piece of work operated upon can be removed without interfering with the operation of the milling machine upon other pieces of work. It is therefore evident that should the piece of work require further operations, the carriage can be transferred to the forward end of the milling machine and the table thereof again coupled to the train of tables. This is simply an instance of how the tables can be used for continuous operation in the milling machine.

The side of the knee 5 has the ordinary and well known type of trip and reverse speed mechanism 38 (see Fig. 1), said mechanism having the main shaft 39 thereof detachably connected by a universal coupling 40 to a telescopic transmission shaft 41, said shaft being coupled in a similar manner to a drive shaft 42 revolubly supported by the column 1 of the milling machine. The feed mechanism 38 is adapted to impart movement to a gear wheel 43 mounted upon the inner end of a shaft 44 arranged longitudinally of the knee 5. Slidably keyed upon the shaft 44 is a small gear wheel 45 having a clutch member 46. This member is adapted to engage a similar member of a beveled gear wheel 47 loosely mounted upon the shaft 44. The beveled gear wheel 47 normally meshes with a horizontally disposed gear wheel 48 secured upon the upper end of a feed screw 49 supported by the base of the milling machine. The feed screw 49 is of the ordinary and well known type employed for vertically adjusting the knee 5 of the milling machine.

Arranged longitudinally of the knee 5, above the shaft 44, is a shaft 50, the greater part of which forms a feed screw 51. Loosely supported at the inner end of the shaft 50 and meshing with the small gear wheel 45 of the shaft 44 is a small gear wheel 52 having a clutch member 53 adapted to be shifted into engagement with a clutch member 54 keyed or otherwise secured to the shaft 50. The feed screw 51 is in screw threaded engagement with a nut 55 supported by a tubular bearing 56 forming part of a block 57 mounted in the lower part of the saddle 6. The block 57 constitutes a vertical bearing which extends into the rack way 23 of the saddle. Revolubly mounted in the block 57 is a vertical shaft 58 having the upper end thereof provided with a horizontally disposed beveled gear wheel 59 normally meshing with the beveled gear wheel 14 of the shaft 12. The lower end of the shaft 58 has a horizontally disposed beveled gear wheel 60 meshing with a similar gear wheel 61 having a tubular hub 62 journaled in the bearing 56. The tubular hub 62 has a gear wheel 63 normally meshing with an elongated gear wheel 64 mounted upon the shaft 44.

As clearly illustrated in Fig. 8, the saddle 6 can slide longitudinally of the knee 5 and a gib 65 is employed for positively locking the saddle relatively to the knee when it is desired to firmly hold the saddle. Fig. 8 also illustrates levers 66 for shifting the clutch members 46 and 53 of the gear wheels 45 and 52 respectively.

Reference will now be had to Figs. 11 and 12, illustrating a portion of an ordinary milling machine, wherein the saddle 67 has a table 68, which under ordinary conditions shifts back and forth upon the saddle. In order that our tables can be used in connection with an ordinary milling machine, we provide an auxiliary saddle 69. The saddle 69 is rectangular in plan and is provided with depending longitudinal parallel ribs 70 and 71, the latter having set screws 72 or other fastening means whereby the auxiliary saddle 69 can be clamped upon the table 68. The top of the saddle 69 has longitudinal parallel gibs 73 and 74, the former being located at the rear edge of the saddle 69 and extending from one end thereof to the opposite end, while the latter gib is located centrally of the saddle and approximately one third the length of the gib 73. The purpose of this arrangement will presently appear.

The saddle 69, intermediate the ends thereof, is provided with a diagonally disposed revoluble shaft 75 that intersects a rack way 76 extending from one end of the table to the opposite end thereof. The shaft 75, within the rack way 76, has a worm 77, and one end of the shaft extends into a box or casing 78, carried by the rear edge of the auxiliary saddle. Within the box or casing 78 is a transmission mechanism 79 adapted to be operated by the transmission shaft 41, which is uncoupled from the feed mechanism and connected, as shown in Fig. 11, for imparting movement to the shaft 75.

One or more tables 80 can be used in connection with the auxiliary saddle 69 and each table is approximately one third the length of the saddle. The tables are adapted to be moved between the gibs 73 and 74 by the worm 77 engaging a rack 81 of a table 80, and with the gib 74 of less length than the gib 73, a table can be placed in engagement with the gib 73 and shifted longitudinally of the saddle, whereby it will follow a table containing a piece of work. In this manner, a plurality of tables can be successively fed between the gib 73 and 74, or a single table can be repeatedly returned to the forward end of the saddle to pass between the gibs. There is sufficient space upon the auxiliary saddle to permit of a table being shifted in the above manner and to further guard against accidental displacement of the saddle relatively to the table 68, bolts 82 or other fastening means can extend downwardly through the auxiliary saddle into the table 68 of the milling machine.

A modified form of table drive is illustrated in Figs. 13 and 14, the drive being especially designed for heavy duty milling machines requiring a more efficient and direct drive than the lighter type of machine. The feed mechanism 83, carried by the knee of the milling machine has a shaft 84 thereof extending into a housing 85, carried by a saddle 86. The shaft 84, within the housing 85, has a worm 87 meshing with a spur wheel 88 mounted upon a shaft 89 journaled in the housing. The shaft 89 has a large gear wheel 90 meshing with a small gear 91 mounted upon a counter shaft 92 journaled in the housing. The counter shaft 92 has a spur wheel 93 meshing with a worm 94, carried by a diagonally disposed shaft 95 journaled in the saddle 86. The shaft 95 is somewhat similar to the shaft 12 and besides having a worm 96 for moving a table longitudinally of the saddle, said shaft has a clutch and a shifting device generally designated 97.

From the foregoing it will be observed that by providing a plurality of work holding tables and connecting the same to move in train formation upon the saddle of a milling machine, less power is required and consumed in proportion to the work accomplished and that the wear and tear upon the milling machine is reduced approximately one half by reason of the work holding tables moving in one direction, instead of being reciprocated as in an ordinary milling machine. In an ordinary milling machine the feed is generally located in the table, while in our improved machine the feed is located in the saddle directly beneath a table, thereby insuring greater rigidity and precision, besides a reduction in the power ordinarily employed for this purpose. The very fact that a carriage can be positioned at the rear end of the saddle to receive a table and then shifted to the forward end of the saddle permits of a piece of work being expeditiously operated upon, and with the holders of the carriages supporting the tables, as illustrated in Fig. 4, the tables are properly alined to be coupled and moved between the gibs, without subjecting the same to any stresses or strains until the entire weight of a table is upon the saddle.

Practically the same results can be obtained by the attachment shown in Figs. 11 and 12 by simply coupling up the transmission shaft 41, and as before stated, one or more tables can be used in connection with the attachment or a single table for repeated passages in the machine.

We attach considerable importance to the fact that the driven feed shaft 12 is diagonally disposed within the saddle of the milling machine or the saddle of the attachment to the machine, thus permitting of easy access being had to the ends of the shaft for minute and rapid adjustment thereof. Another important feature which has a distinct advantage over the old type of milling machine is that of applying power to the feed shaft and transmitting the same to the tables at a point directly beneath a cutter of a milling machine, consequently there is no tendency of a table and the piece of work carried thereby to move other than in a true straight line with a minimum degree of friction between the table and the gibs of the guide way.

What we claim is:

1. In a milling machine, a table feed, and interlocked abutting tables capable of being repeatedly connected and disconnected to said table feed to move in one direction in said machine.

2. In a milling machine, a saddle, a table feed carried thereby, table abutting sections adapted to be moved in one direction upon said saddle by said table feed, and means adapted to adjust said saddle.

3. In a milling machine, an adjustable saddle, a plurality of detachably connected tables adapted to be moved in one direction upon said saddle, and means operatable from the rear side of said saddle for moving said tables.

4. In a milling machine, a saddle, a plurality of abutting tables adapted to be guided over said saddle in a train whereby sections can be removed at one end and placed at the opposite end of the train, and means for detachably connecting the ends of the tables.

5. In a milling machine, a table adapted to be repeatedly fed through said machine, diagonally disposed power means forming part of said machine for moving said table therethrough, and means alining with said power means for manually adjusting a table.

6. In a milling machine, a plurality of interlocked abutting tables adapted to be repeatedly fed through said machine, diagonally disposed means forming part of said machine for moving said tables therethrough, and means adapted to vertically and laterally adjust said means.

7. In a milling machine, a saddle, a table adapted to be repeatedly fed over said saddle, diagonally disposed means carried by said saddle for moving said table, and means operatable from the rear side of said saddle for imparting movement to said saddle moving means.

8. In a milling machine, a plurality of inter-locked tables adapted to be repeatedly fed through said machine in one direction, and means movable from one end of said machine to the other for supporting said tables and transferring the same from one end of the machine to the opposite end thereof.

9. In a milling machine, a saddle, a sectional table having a dove tail connection with said saddle and adapted to be repeatedly moved in one direction upon said saddle, a diagonally disposed feed within said saddle for moving said sectional table longitudinally thereof, and means below said table feed for vertically and laterally adjusting said saddle.

10. In a milling machine, an adjustable saddle, a diagonally disposed table feed carried thereby, a train of detachably connected tables adapted to be moved in one direction over said saddle by said table feed, and table holders movable from one end of the machine to the other end and adapted to transfer a table from one end of the train to the opposite end thereof.

11. In a milling machine, a lateral adjustable saddle, a table feed carried thereby, means below the operating tool of said machine for imparting movement to said table feed, and inter-locked abutting tables adapted to be moved in one direction upon said saddle by the table feed thereof.

12. In a milling machine, a vertically and laterally adjustable saddle, a diagonally disposed table feed carried thereby, means below the operating tool of said machine for imparting movement to said table feed, a train of inter-locked abutting tables adapted to be moved in one direction upon said saddle by said table feed, and table holders movable from one end of the machine to the other and adapted to transfer a table from one end of the machine to the opposite end thereof.

13. In a milling machine, a saddle, normally abutting interlocked table sections movable upon said saddle, means for detachably connecting the table sections together, and means diagonally disposed upon said saddle for imparting movement to said table sections.

14. In a milling machine, a saddle, gibs carried thereby with one of said gibs of less length than the other, and tables adapted to be successively moved in one direction between said gibs.

15. In a milling machine, an adjustable saddle, gibs carried thereby with one of said gibs of a less length than the other, a table adapted to be repeatedly moved between said gibs in one direction, and means carried by said saddle for moving said table when between said gibs.

16. In a milling machine, a saddle, gibs carried thereby with one of said gibs of a less length than the other, a table adapted to be repeatedly moved in one direction between said gibs, and means diagonally disposed within said saddle for moving said table when between said gibs.

17. In a milling machine, a saddle, normally abutting interlocked table sections movable upon said saddle, means for detachably connecting the table sections together, means diagonally disposed upon said saddle for imparting movement to said table sections, and means in said saddle and alining with the last mentioned means for manually adjusting a table section.

18. In a milling machine, a saddle, normally abutting interlocked table sections movable upon said saddle, means for detachably connecting the table sections together, means diagonally disposed in said saddle for imparting movement to said table sections, means in said saddle and alining with the last mentioned means for manually adjusting a table section, and means in said saddle and disposed at an angle to the last mentioned means for controlling the operative relation of said manually adjusting means relative to said table holding means.

19. In a milling machine, a vertically and laterally adjustable saddle, a diagonally disposed table feed carried thereby, means below the operating tool of said machine for imparting movement to said table feed, a train of interlocked abutting tables adapted to be moved in one direction upon said saddle by said table feed, means in said saddle and alining with said table feed for manually adjusting a table prior to interlocking a series of tables, and table holders movable from one end of the machine to the other and adapted to transfer a table from one end of the machine to the opposite end thereof.

20. In a milling machine, an adjustable saddle, a diagonally disposed table feed carried thereby, means below the operating tool of said machine for imparting movement to said table feed, a train of interlocked abutting tables adapted to be moved in one direction upon said saddle by said table feed, means in said saddle alining with said table feed for manually adjusting a table prior to interlocking a series of tables, means in said saddle and disposed at an angle to the last mentioned means for controlling the operative relation of said manually adjustable means relative to said table moving means, and table holders movable from one end of the machine to the other and adapted to transfer a table from one end of the machine to the opposite end thereof.

In testimony whereof we affix our signatures in presence of two witnesses.

SAMUEL JOSEPH TODD.
ALBERT MILTON HUMBER.

Witnesses:
 OTTO F. NORTH,
 ANNA M. DORR.